United States Patent [19]

Böhme et al.

[11] Patent Number: 5,677,394
[45] Date of Patent: Oct. 14, 1997

[54] MELT-PROCESSABLE BLOCK COPOLYESTERIMIDE AND METHOD FOR MANUFACTURING IT

[75] Inventors: Frank Böhme; Doris Pospiech; Manfred Rätzsch, all of Dresden, Germany; Christer Bergström, Espoo, Finland; Mika Härkönen, Vantaa, Finland; Heli Alanko, Klaukkal, Finland; Pentti Passiniemi, Helsinki, Finland

[73] Assignee: Neste OY, Espoo, Finland

[21] Appl. No.: 406,859

[22] PCT Filed: Sep. 17, 1993

[86] PCT No.: PCT/FI93/00374

§ 371 Date: Apr. 28, 1995

§ 102(e) Date: Apr. 28, 1995

[87] PCT Pub. No.: WO94/06846

PCT Pub. Date: Mar. 31, 1994

[30] Foreign Application Priority Data

Sep. 18, 1992 [FI] Finland ................. 924200

[51] Int. Cl.$^6$ ................. C08L 79/08; C08G 73/16
[52] U.S. Cl. ................. 525/425; 525/174; 525/184; 525/432; 525/445; 525/436; 528/170; 528/184; 528/193
[58] Field of Search ................. 525/425, 432, 525/436, 445, 174, 184; 528/170, 184, 193

[56] References Cited

U.S. PATENT DOCUMENTS

| | | | |
|---|---|---|---|
| 4,556,705 | 12/1985 | McCready | 524/101 |
| 4,727,129 | 2/1988 | Hisgen et al. | 528/171 |
| 4,728,713 | 3/1988 | Hisgen et al. | 528/183 |
| 4,728,714 | 3/1988 | Hisgen et al. | 528/183 |
| 4,861,857 | 8/1989 | Kricheldorf | 528/170 |

FOREIGN PATENT DOCUMENTS

| | | |
|---|---|---|
| 0179470 | 4/1986 | European Pat. Off. |
| 0180149 | 5/1986 | European Pat. Off. |
| 0421603 | 4/1991 | European Pat. Off. |
| 3516247 | 11/1986 | Germany |

OTHER PUBLICATIONS

Kricheldorf, et al. "New Polymer Syntheses 22", Journal of Polymer Science, Polymer Chemistry, 1989, V. 27, pp. 1431–1439, Jan. 1989.
Kricheldorf, H.R. and Pakull, R., *Polymer*, vol. 28 (1987), pp. 1773–1778.
Kricheldorf, H.R. and Pakull, R., *New Polymeric Mater.*, vol. 1 (1989), pp. 165–176.
Wang, J. and Lenz, R.W., *Polymer Engineering and Science*, vol. 31 (1991), pp. 739–742.
Dreyfuss, P., *Polymer Monographs*, vol. 8, Gordon and Breach, Science Pul., New York, London, Paris 1982, 306–393.

*Primary Examiner*—Irina S. Zemel
*Attorney, Agent, or Firm*—Cohen, Pontani, Lieberman & Pavane

[57] ABSTRACT

A melt-processable block copolyesterimide comprising the repeating units (I), (II) and (III) and, optionally, a repeating unit (IV), wherein (I) is a repeating unit of the formula

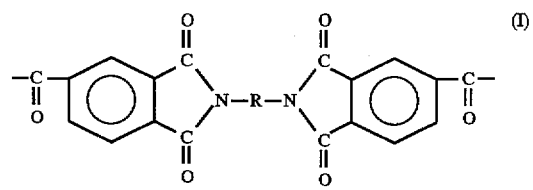

wherein R is an aliphatic polyether chain and/or a polysiloxane chain; (II) and (III) are repeating units of the formulas

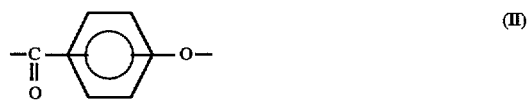

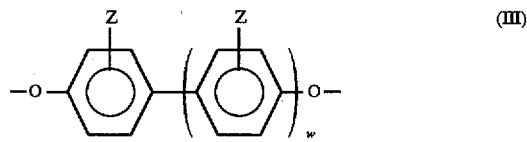

wherein Z is hydrogen, alkyl, alkoxy, aryl, halogen and w is zero or one; and (IV) is a repeating unit of the formula

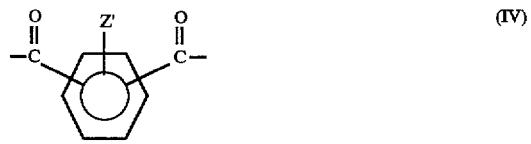

wherein Z' is hydrogen, alkyl, alkoxy, aryl or halogen and the phenylene ring is substituted in by Z' in the m- or p-positions. The repeating unit of formula (I) is present in an amount of 5 to 50 mole-%, the repeating unit of formula (II) is present in an amount of 10 to 80 mole-%, the repeating unit of formula (III) is present in an mount of 5 to 50 mole-% and the repeating unit of formula (IV) is present in an amount of 0 to 45 mole-% of the block copolyesterimide. The polymer according to the invention has liquid crystalline properties and it can be used as thermoplastic elastomer component of polymer compounds.

14 Claims, No Drawings

MELT-PROCESSABLE BLOCK COPOLYESTERIMIDE AND METHOD FOR MANUFACTURING IT

The present invention relates to block copolymers and to a method for manufacturing them.

Liquid crystalline polymers are polymers which in melt state exhibit optical anisotropy. The strength and stiffness of many thermoplastics can be substantially improved by blending them with thermotropic, main-chain liquid crystalline polymers. This is because the liquid crystalline polymers form fibres which orientate in the flow direction of the thermoplastic matrix melt. As a result there is an improvement of the mechanical properties, such as tensile strength and modulus of elasticity, of the thermoplastic in this direction. Often, the addition of the liquid crystalline polymer also improves the heat resistance and dimensional stability of the thermoplastics and makes it easier to process them. Liquid-crystal polymers are, for the above reasons, being investigated widely.

The actual liquid crystal in liquid crystalline polymers is formed by a rigid structural unit called a mesogen. Mesogens are generally formed by two or more linearly substituted ring units linked to each other via a short, rigid bridging group known as a spacer. As examples of mesogenic structural units, the polyester groups formed by hydroxy benzoic acid, terephthalic acid and hydroquinone should be mentioned. Liquid-crystal polymers can be divided into two main categories, viz, main-chain and side-chain liquid-crystal polymers, depending on whether the mesogenic groups are located in the main chain or in the side chain. Main-chain liquid crystalline polymers are generally polymers of highly rigid character whose stable crystalline structure can only be melted by using abundant energy. Therefore, their melting occurs at high temperatures, whereby thermal decomposition is simultaneously involved.

As far as liquid crystalline polymers and their properties are concerned, reference is made to the review article by Chung et al. in Handbook of Polymer Science and Technology, 2 (1989) pp. 625 to 675.

Block polyesterimides with liquid crystalline properties are known in the art. Said polymers have been described in, for instance, U.S. Pat. Nos. 4,727,129, 4,728,713 and 4,728,714. The prior art aromatic compounds have, according to the patent specifications, good strength and heat and wear resistance. At temperatures below 320° C. the polymers provide melts which form liquid crystalline fibers. The prior an compounds do not, however, have the properties needed for thermoplastic elastomer applications, such as good flexibility at low temperatures and thermal and hydrolytical stability.

It is an object of the present invention to solve the problems relating to the prior an and to provide an entirely novel kind of a liquid crystalline polyesterimide, which can be used as a thermoplastic elastomer component in polymer compounds.

According to the present invention, there is provided a novel (A-B)$_t$-type block copolymer wherein t is an integer, typically about 3 to 100, the second block (B) being formed by a rigid aromatic polyester segment. According to the invention, block A comprises a flexible trimellitimide terminated polyether or a polysiloxane. The structure of block A is typically

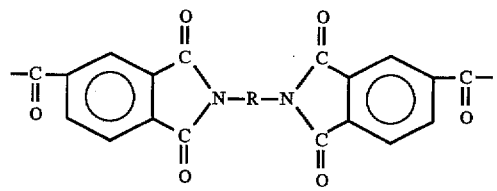

wherein R stands for a polyether or polysiloxane.

In more detail, the liquid crystalline polymer according to the invention is mainly characterized by what is stated in the characterizing part of claim 1.

The method according to the invention is, again, characterized by what is stated in the characterizing part of claim 10.

The compounds according to the invention are characterized by what is stated in the characterizing part of claim 14.

To complete the survey of the prior art, it should be mentioned that block copolymers containing polyether, in particular poly(tetrahydrofuran) are known per se. Reference is made to the article by Wang and Lenz in Polymer Engineering and Science [31 (1991) pp. 739 to 742]. The structure of this known polymer is

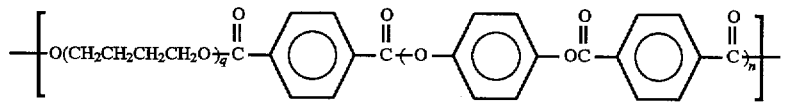

and it does not contain a polyesterimide structure according to the present invention. Its properties are also different from those of the present polymers.

High molecular weight diimide diacids of tricarboxylic acids are also known per se. We refer to European Published Patent Application No. 0 180 149, which describes the preparation of these compounds in a dipolar aprotic solvent, such as xylene, at temperatures in the range of 150° to 300° C. The process of the present invention differs from the prior art in the sense that Block A of the compound is prepared by using a cyclic ether (dioxane), which makes it possible to lower the temperature to 100° C.

U.S. Pat. No. 4,556,705 discloses thermoplastic poly (ether/imide/esters) containing structures similar to the ones disclosed in the European Published Patent Application No. 0 180 149. The compounds are not liquid crystalline. From the U.S. publication it appears that component a of the polymers is comprised of one or more low molecular weight $C_2$ to $C_{15}$ aliphatic or cycloaliphatic diol(s). The aromatic dicarboxylic acids of the known compounds preferably comprise dimethyl terephthalate. As the description given below will show in more detail, the present polymers differ from the compounds according to the U.S. Pat. No. 4,556,705 in that, for instance, the aromatic diols contain at least 18 carbon atoms (3 phenylene rings), i.e. they are complex diols having an aromatic polyester chain. Furthermore, the polymers, wherein the molecular weight of the poly(THF) is about 1000 to 2000, are liquid crystalline. Polymers with poly(THF) units having molecular weights in excess of 2000 are isotropic. The process for preparing the present polymers also differs from the process disclosed in the U.S. reference. Thus, the polymers according to the invention are prepared by transesterification of acylated aromatic diols with aromatic dicarboxylic acids. In this reaction, acetic acid is formed. Surprisingly, said strong acid does not give rise to chain scission of the poly(oxyalkylene) chain at the high reaction temperature applied, which can be shown by $^{13}$C NMR spectroscopy.

The rigid segment (B) of the novel block copolymers is formed by an aromatic polyester structure commonly used in liquid crystalline polymers. We refer to what was stated above concerning the mesogenic groups and to the structural formulas given below.

Finally, as far as the prior art is concerned, it should be mentioned that DE Published Patent Application No. 3,516,427 discloses thermotropic polyesterimides, which contain $C_8$ to $C_{16}$ alkylene-α,ω-bis-trimellitimide units. In these known polyesterimides the mesogenic units contain only one phenylene ring, whereas the mesogenic units of the present polymers preferably contain at least 3 phenylene rings. The prior art polymers do not, either, contain spacers similar to the ones used in the invention, i.e. polyoxyalkylene or polysiloxane segments; the alkylene units used are relatively short chained ($C_{16}$) and, thus, differ essentially from, for instance, the poly(THF) units used in the invention.

The polymers according to the invention contain polyoxyalkylene or polysiloxane units, trimellitimide units and large polyester blocks, which consist of phenylene rings attached to each other with ester bonds. The polymers have elastomeric and thermotropic properties in combination with the properties of the polyoxyalkylene (polysiloxane), trimellitimide and the aromatic polyester chain. The advantageous properties of the polymers are a result of the combination of the structural elements shown below.

According to an embodiment of the invention, polyesterimide block copolymers are provided having repeating units of formulas (I), (II) and (III) and possibly a repeating unit of formula (IV), wherein (I) is a repeating unit of the formula

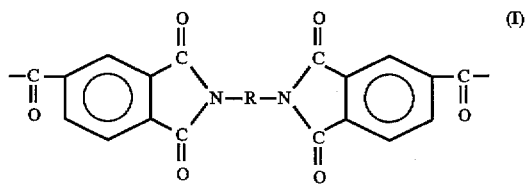

wherein R is at least one of an aliphatic polyether chain and a polysiloxane chain;

(II) is a repeating unit of the formula

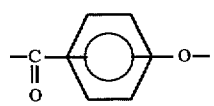

(III) is a repeating unit of the formula

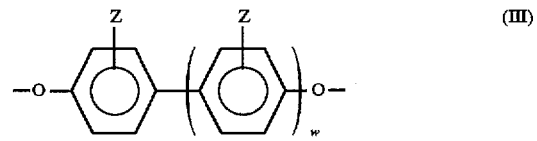

wherein Z is hydrogen, alkyl, alkoxy, aryl or halogen, and w is zero or one; and (IV) is a repeating unit of the formula

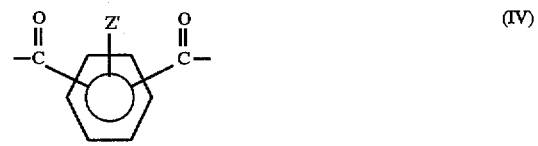

wherein Z' is hydrogen, alkyl, alkoxy, aryl or halogen and the phenylene ring is substituted in by Z' m- and p-positions.

According to the invention, in the copolymer according to formula (I) the repeating unit of formula (I) is present in an amount of 5 to 50 mole percent of the block copolyesterimide, the repeating unit of formula (II) is present in an amount of 10 to 80 mole percent of the block copolyesterimide, the repeating unit of formula (III) is present in an amount of 5 to 50 mole percent of the block copolyesterimide, and the repeating unit of formula (IV) is present in an amount of 0 to 45 mole percent of the block copolyesterimide.

The polyether "R" can, for instance, comprise poly (methylene oxide), poly(ethylene oxide) or poly(butylene oxide). Alkyl- and aryl-substituted groups may be mentioned among the polysiloxanes.

Thus, according to a preferred embodiment of the invention R comprises a repeating unit of formula (V)

wherein X is hydrogen or methyl, n is 0, 1, 2 or 3, and m is an integer of 3 to 65, or optionally, a repeating unit of formula (VI)

wherein Y is alkyl or aryl, preferably methyl and p is an integer of 5 to 30.

In particular, R is a poly(butylene ether) which in the following will be called poly(tetrafuran) (polyTHF), the structure of segment A being:

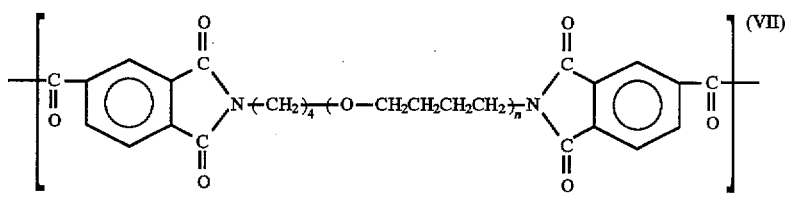

wherein n is an integer in the range of 3 to 65, preferably 10 to 30.

In the below examples, a poly(tetrahydrofuran) with a comparatively low molecular weight of about 1000 to 2000 has been used.

Within the scope of the present application, the term "halogen" denotes fluorine, chlorine, bromine or iodine, preferably chlorine, bromine or iodine, in particular chlorine or bromine. "Alkyl" is preferably a straight- or branched-chained, saturated lower alkyl group containing 1 to 6, preferably 1 to 4 carbon atoms. The following examples can be listed: methyl, ethyl, n-propyl, isopropyl, n-butyl, sek-butyl, tert-butyl (1,1-dimethylethyl) and 2-methylbutyl. "Alkoxy" represents a lower alkoxy containing preferably 1 to 6 carbon atoms, in particular 1 to 4 carbon atoms, such as methoxy, ethoxy, propoxy and tert-butoxy. "Aryl" is a monovalent aromatic group, such as phenyl and benzyl.

According to a second preferred embodiment of the invention there is prepared a melt-processable block copolyesterimide (a-b-c), which comprises the reputing units of formula VIII copolyesterimide and the molar amounts of each symbol "a", "b" and "c" correspond to the following formulas:

$a+b+c=1$ and $a=b$

In particular, in the formulas presented above w preferably stands for 0 and a, b and c represent the following concentration ranges:

$a=0.05$ to $0.5$ $b=0.05$ to $0.5$ $c=0.1$ to $0.8$

A particularly preferred structure is represented by an embodiment, wherein w is 1 and a, b and c represent the above concentration ranges.

Of the polymers according to the invention, the structure of the monomer of a preferred polymer is depicted in formula (IX):

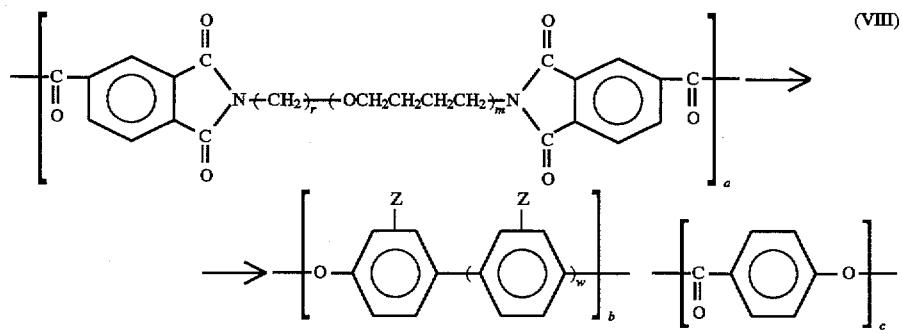

wherein z is hydrogen, alkyl, aryl or halogen, r is for instance 4, m is 3 to 65 and w has the same meaning as above, and a, b and c represent the respective molar amounts of each of the repeating units of the block

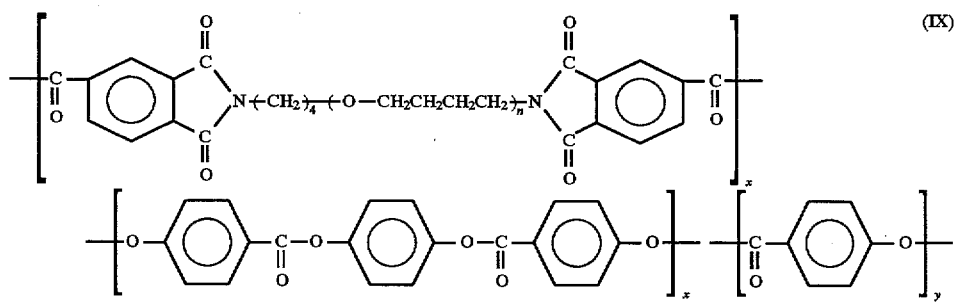

wherein n is an integer 3 to 65, x is 10 to 100 and y is 20 to 160.

Typically the block copolyesterimides described above are capable of forming an anisotropic melt phase at temperature below 250° C., which makes it possible to use them for preparing melt-processable polymer blends, i.e. polymer compounds.

In special cases (for instance when the molecular weight of the poly(THF) is higher than 2000 and the content of aromatic units is low, and in case of polymers prepared from isophthalic acids), the products are not liquid crystalline. These polymers can, however, also be used for the preparation of various compounds because they have elastomeric properties.

The block copolyesterimides according to the invention can be prepared by mixing a carboxyl-terminated compound of formula (X)

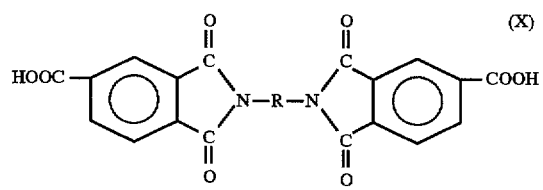

wherein R corresponds to formula V or formula VI given above, with a para- and/or meta-acetoxycarboxylic acid of formula (XI)

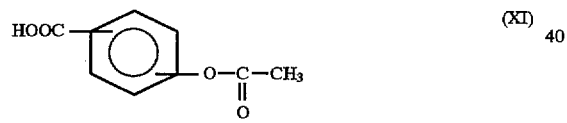

and with a diacetoxy compound of formula (XII)

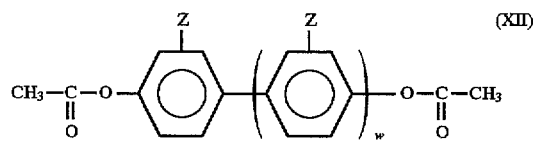

wherein w and z have the same meaning as above, and, optionally, with aromatic dicarboxylic acids of formula (XIII)

wherein z' has the same meaning as above,
then fusing the mixture, splitting off the acetic acid formed, and condensing the mixture under reduced pressure at temperatures in the range of 150° to 300° C.

According to a second embodiment, the block copolyesterimides according to the invention are prepared by mixing a carboxyl-terminated compound according to formula (X), wherein R represents a group of formula V or formula VI, with a para- and/or meta-acetoxycarboxylic acid of formula (XI) and an acetoxy-terminated compound of formula (XIV)

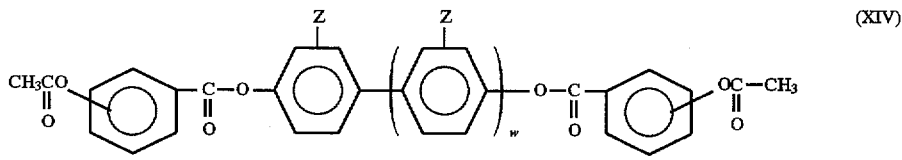

(wherein z and w have the same meaning as above), then fusing the mixture, splitting off the acetic acid formed and condensing the mixture under reduced pressure at a temperature in the range of 150° to 300° C.

In particular a carboxyl-terminated compound of formula (X) is prepared by reacting an amino-terminated compound of formula (XV)

$$H_2H—R—NH_2 \quad (XV)$$

wherein R has the same meaning as above with a trimellitic anhydride in dioxane, followed by removal of the dioxane under reduced pressure and thermal treatment.

According to a preferred embodiment of the invention, the polymerized monomer is obtained by either condensing two moles of a para- or meta-hydroxycarboxylic acid of formula (XVI)

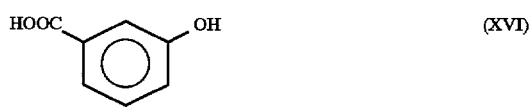

with one mole of an acetoxy compound of formula (XII), followed by acylation of the hydroxyl groups, or by condensing in pyridine two moles of an acetoxy carboxylic acid chloride derived from a compound of formula (XI) with one mole of a dihydroxy compound of formula (XVII)

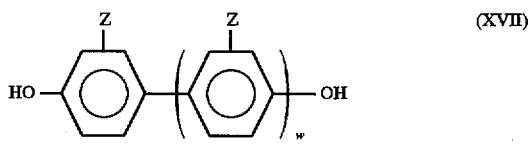

wherein z and w have the same meaning as above, followed by precipitation and extraction in methanol and drying.

The polymer described herein is well suited to use in blends with thermoplastics, in particular with polyolefins and polyolefinic copolymers, and with polyesters. As examples of the polyolefins, the following should be mentioned: polyethylene, polypropylene, polybutene, polyisobutylene, poly(4-methyl-1-pentylene) including copolymers of ethylene and propylene (EPM, EPDM) and chlorinated and chlorosulfonated polyethylenes. Alternative matrix polymers comprise the corresponding polyalkenes containing styrene, acryl, vinyl and fluoroethyl groups, as well as various polyesters, such as poly(ethylene terephthalate), poly(butylene terephthalate) and polycarbonates. In addition to the above mentioned, the polyester according to the invention can be blended with polyamides and polyethers.

The thermoplastic/liquid crystalline polymer blends according to the invention can be prepared by methods known per se.

The mixing methods are either batch or continuous processes. As examples of typical batch mixers, the Banbury mixer and the heated roll mill may be mentioned. Continuous mixers are exemplified by, for instance, the Farrel mixer, and single- and twin-screw extruders. Preferably single- or twin-screw extruders are used for blending the liquid crystalline polymer with the thermoplastic. The liquid crystalline polymers are blended with the thermoplastics either by first premixing the liquid crystalline polymers with the thermoplastics in a twin-screw extruder and then processing them in an injection molding machine or, alternatively, by processing them by injection molding or extrusion without premixing.

By attaching polysiloxane or polyether units, in particular units of poly(tetrahydrofuran) as soft segments to the block copolymer of the invention, thermally stable thermoplastic elastomers are provided exhibiting excellent resistance to wear and good dynamical properties. They also have excellent elastomeric properties at low temperatures. At the same time, it has surprisingly been found that the polymers according to the invention have a better heat resistance than elastomeric materials generally, which makes it possible to use products fabricated from the polymers in elastomeric applications wherein good strength is required at high temperatures. The polymer or blends thereof can be used in particular as thermoplastic elastomers in injection molded, blow molded, extruded and deep drawn articles, profiles, films, robes, pipes, cables and sheets. Flexible containers and car parts fitted under the hood of the engine can be particularly mentioned as fields of application of the present polymers.

The polymers according to the invention can also be employed as compatibilizers in blends of thermoplastic polymers and liquid crystalline polymers, said polymers being capable of improving the impact strength of said blends without substantially impairing longitudinal strength. The compatibilizer applications include in particular blends of liquid crystalline polymers with polyolefins, polyether, polyesters, polyamides or polyimides. There can be one or more thermoplastic polymers in the blends.

Next, the invention will be examined in more detail with the aid of a number of non-limiting working examples:

EXAMPLE 1

Preparation of Trimellitimide-terminated Poly(THF)

In a three-necked flask of 1 litre capacity equipped with a mechanical stirrer and a reflux condenser, the following reactants were charged:

40 g of poly(THF)-diamine with a molecular weight of 1100 g/mole (dried at 50° C. for two days in a vacuum oven), 13.6 g of trimellitic anhydride and 800 ml of dioxane (dried over KOH and distilled).

The reaction mixture was stirred under reflux for 8 hours. After cooling, dioxane was removed by evaporation in a vacuum rotator at 50° C. The crude product was imidized at 180° C. for 30 min. with a vacuum of 2 Torr.

A light-brown resin was obtained with a molecular weight of 1200 g/mole measured by titration of the COOH-end groups.

EXAMPLE 2

This example illustrates polycondensation of trimellitimide-terminated poly(THF)1000 with an acetoxy-terminated trimer designed HBA-HQ-HBA of the following formula and p-acetoxybenzoic acid.

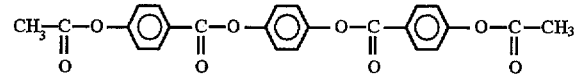

(the synthesis of this monomer is given by W. R. Krigbaum, R. Kotek, T. Ishikawa. H. Hakemi. J. Preston: Europ. Polym. J. 20, 3. 225–235 (1984) and D. van Luyen. L. Strzelecki: Europ. Polym. J. 16, 303 (1980)

The polycondensation equipment employed was a three-necked flask of 100 ml capacity equipped with a stirrer, $N_2$-inlet tube and distillation head. The equipment was heated by means of a metal bath.

To the above reactor, the following reactants were charged:

a) 8.6 g of trimellitimide-terminated poly(THF)1000 (7.60 mmoles), b) 3.30 g of acetoxy-terminated HBA-HQ-HBA (7.60 mmoles) and c) 1.18 g of p-acetoxybenzoic acid (6.51 mmoles)

At ambient temperature, the reaction flask is evaporated and filled with nitrogen three times. Thereafter, the flask is immersed into a metal bath of a temperature of 220° C. The reaction is carried out under stirring and a slight nitrogen stream at 220° C. for 5 minutes. After this time, the temperature of the metal bath is raised to 260° C. (in 10 minutes). The polycondensation is carried out at 260° C. for a further 30 minutes, and finally for 30 minutes at 260° C. under a vacuum of 1 to 2 Torr. During the whole process, distillation of acetic acid can be observed. The resulting polymer is a light-brown rubber-like product.

The relative viscosity was measured in a phenol/1,1,2,2-tetrachlorethane mixture (1:1 by vol) with a polymer concentration of 0.5 g/dl by means of an Ubbelohde capillary. viscosimeter (capillary Ia) at 25° C. The inherent viscosity is calculated by the following formula:

$$n_{inh} = \frac{\ln(n_{rel})}{Cpol}$$

The inherent viscosity of the resulting polymer was 0.757 dl/g. The molecular weights measured by GPC with polystyrene standard were found to be $M_n$=95,000 g/mole and $M_w$=180,000 g/mole).

The polymer, when examined by means of polarizing microscopy equipped with a heating stage, showed at temperatures of 160° C. a strong birefringence as indication of a thermotropic liquid-crystalline behaviour of the polymer.

EXAMPLE 3

In the same equipment and following the same procedures as in Example 2, the following reactants were polymerized:

a) 10.26 g of trimellitimide-terminated poly(THF)1000 (9.8 mmoles), b) 2.65 g of diacetoxy diphenyl (9.8 mmoles) and c) 3.53 g of p-acetoxybenzoic acid (19.6 mmoles)

The polymer obtained was not soluble in phenol/tetrachlorethane. When subjected to DSC analysis, the melting was found to be at 211° C. (peak maximum) with a melting enthalpy of 2.6 J/g. The melting temperature was found to be at 160° C. by polarizing microscope. The polymer forms a liquid-crystalline phase in the melt.

EXAMPLE 4

In the same equipment and following the same procedures as in Example 2, the following reactants were polymerized:

a) 5.832 g of trimellitimide-terminated poly(THF)1000 (5.66 mmoles), b) 1.11 g of hydroquinone diacetate (5.66 mmoles) and c) 3.056 g of p-acetoxybenzoic acid (0.17 mmoles)

The resulting rubber-like brown product has a very low melting temperature of 115° C. and an isotropization temperature of 140° C. as obtained by polarizing microscopy. It showed under crossed polarizers a liquid-crystalline melt.

EXAMPLE 5

Preparation of an Acetoxy-terminated Precursor for Polycondensation

In a three-necked flask of 500 ml capacity equipped with a mechanical stirrer, $N_2$-inlet tube and distillation head the following reactants were charged:

a) 65.50 g of p-hydroxybenzoic acid (0.475 moles) and b) 46.51 g of hydroquinone diacetate (0.237 moles)

The flask is evaporated and thereafter filled with dried nitrogen for three times at ambient temperature. After this procedure, the flask is immersed into a metal bath of a temperature of 260° C. The reaction is carried out for 30 minutes at 260° C. under stirring and slight nitrogen stream. After this time, the temperature of the metal bath is increased to 270° C. and the reaction is continued for 90 minutes at this temperature. At the end of the reaction, the flask is removed from the bath. After cooling down, the reaction product is removed from the flask and powdered in an analysis mill.

The resulting powder is charged together with 500 ml of acetic anhydride in a three-necked flask of 1 l capacity, equipped with a mechanical stirrer and a reflux condenser. The reaction mixture is refluxed under stirring for 12 hours. After cooling, the resulting white product is filtered off, washed with distilled water and dried in a vacuum oven for 8 hours.

The IR spectrum of the product shows complete acetylation without free OH-groups (typical acetoxy-signals at 1750, 1740, 1370, 1210 and 1080 $cm^{-1}$).

EXAMPLE 6

In the same equipment and following the same procedures as in Example 2, the following reactants were polymerized:

a) 4.76 g of trimellitimide-terminated poly(THF)1000 (4.55 mmoles) and b) 1.98 g of the acetoxy-terminated precursor according to Example 5 (4.55 mmoles)

The resulting product has a melting temperature of 150° C., an isotropization temperature of 185° C. and shows in the range of 150° C. to 185° C. a liquid-crystalline melt observed by polarizing microscopy. Its inherent viscosity in phenol/tetrachlorethane is 0.78 dl/g.

EXAMPLE 7

In the same equipment and following the same procedures as in Example 2, the following reactants were polymerized:

a) 4.07 g of trimellitimide-terminated poly(THF) 1000 (3.1 mmoles), b) 0.52 g of terephthalic acid (3.1 mmoles), c) 2.69 g of acetoxy-terminated HBA-HQHBA according to Example 2 (6.2 mmoles) and d) 1.49 g of p-acetoxybenzoic acid (8.27 mmole).

The temperature of the metal bath in the vacuum phase of the polycondensation was kept at 270° C.

The resulting grey product has a melting temperature of 180° C. and shows a liquid-crystalline phase at temperatures up to 350° C. It is not soluble in phenol/tetrachlorethane.

EXAMPLE 8

Following the procedure given in Example 1, 44.12 g of aminoterminated silicone (0.05 mole) of formula 2 of a molecular weight of approximately 880 g/mole given by titration of amino end groups is reacted with 0.1 moles of trimellitic anhydride in 800 ml of dried, distilled dioxane by refluxing the reaction mixture for 8 hours.

$$H_2N-(CH_2)_m-\left[\begin{array}{c}CH_3\\|\\Si-O\\|\\CH_3\end{array}\right]-\begin{array}{c}CH_3\\|\\Si-(CH_2)_m-NH_2\\|\\CH_3\end{array}$$

After removing the solvent, a yellow resin was obtained with a molecular weight of 1070 g/mole measured by titration of COOH-end groups.

EXAMPLE 9

In the same equipment and following the same procedures as in Example 2, the following reactants were polymerized:

a) 4.5 g of trimellitimide-terminated silicone (4.2 mmoles), b) 1.83 g of acetoxy-terminated HBA-HQ-HBA according to Example 2 (4.2 mmoles) and c) 1.52 g of acetoxybenzoic acid (8.4 mmoles).

The resulting light brown brittle polymer has an inherent viscosity of 0.65 dl/g in phenol/tetrachlorethane. The polymer melting temperature is found to be at 150° C. The polymer forms a liquid-crystalline melt phase without isotropization up to temperatures of 350° C.

We claim:

1. A melt-processable block copolyesterimide comprising repeating units (I), (II) and (III) and, optionally, a repeating unit (IV), wherein:

(I) is a repeating unit of the formula

[Structure (I): two phthalimide groups linked by N—R—N, each bearing a —C(=O)— group on the benzene ring]

wherein R is at least one of an aliphatic polyether chain and a polysiloxane chain;

(II) is a repeating unit of the formula

[Structure (II): —C(=O)—C₆H₄—O—]

(III) is a repeating unit of the formula

[Structure (III): —O—C₆H₃(Z)—C₆H₃(Z)—O— with subscript w]

wherein Z is hydrogen, alkyl, alkoxy, aryl or, halogen, and w is zero or one; and (IV) is a repeating unit of the formula $$\begin{array}{c} O \quad Z' \quad O \\ \| \quad \quad \| \\ -C-\!\!\bigcirc\!\!-C- \end{array} \quad (IV)$$

wherein Z' is hydrogen, alkyl, alkoxy, aryl or halogen and the phenylene ring is substituted by Z' in the m- or p-positions; wherein the repeating unit of formula (I) is present in an amount of 5 to 50 mole percent of said block copolyesterimide;

the repeating unit of formula (II) is present in an amount of 10 to 80 mole percent of said block copolyesterimide;

the repeating unit of formula (III) is present in an amount of 5 to 50 mole percent of said block copolyesterimide; and the repeating unit of formula (IV) is present in an amount of zero to 45 mole percent of said block copolyesterimide.

2. The block copolyesterimide according to claim 1, wherein, in said formula (I), R comprises repeating units of the formula (V)

$$-O-[(CH_2)_n-\underset{X}{CH}-O]_m- \quad (V)$$

wherein X is hydrogen or methyl, n is 0, 1, 2 or 3, and m is an integer of 3 to 65, or, optionally, repeating units of the formula (VI), $$\left[ \begin{array}{c} Y \\ | \\ Si-O \\ | \\ Y \end{array} \right]_p \quad (VI)$$

wherein Y is alkyl or aryl and p is an integer in the range from 5 to 30.

3. A block copolyesterimide according to claim 1, wherein said block copolyesterimide is capable of forming an anisotropic melt phase at a temperature of approximately 250° C. or less.

4. A melt-processable block copolyesterimide consisting essentially of the repeating units represented by the formula (VIII)

represent the respective molar amounts of each of the repeating units of the block copolyesterimide and the molar amounts of a, b and c conform to the following relationships:

a+b+c=1 and a=b.

5. A block copolyesterimide according to claim 4, wherein w is 0 and a, b and c represent the following concentration ranges:

a=0.05 to 0.5
b=0.05 to 0.5
c=0.1 to 0.8.

6. A block copolyesterimide according to claim 4, wherein w is 1 and a, b and c represent the following concentration ranges:

a=0.05 to 0.5
b=0.05 to 0.5
c=0.1 to 0.8.

7. The block copolyesterimide according to claim 4, wherein said block copolyesterimide is capable of forming an anisotropic melt phase at a temperature of approximately 250° C. or less.

8. A melt-processable block copolyesterimide, which is capable of forming an anisotropic melt phase at a temperature of approximately 250° C. or less, characterized in that it corresponds to the formula (A-B)$_t$, wherein t is an integer 3 to 100, B represents a rigid aromatic polyester segment and A comprises a flexible trimellitimide terminated polyether or polysiloxane.

9. The block copolyesterimide according to claim 8, wherein A represents a unit of formula (I)

$$\begin{array}{c} O \quad\quad O \\ \| \quad\quad \| \\ -C\!\!-\!\!\bigcirc\!\!\underset{\underset{O}{\overset{\overset{O}{\|}}{C}}}{\overset{\overset{O}{\|}}{C}}\!\!N\!-\!R\!-\!N\!\underset{\underset{O}{\overset{\overset{O}{\|}}{C}}}{\overset{\overset{O}{\|}}{C}}\!\!\bigcirc\!\!-\!C\!- \\ \| \quad\quad \| \\ O \quad\quad O \end{array} \quad (I)$$

wherein R represents a unit of formula (V)

$$-O-[(CH_2)_n-\underset{X}{CH}-O]_m- \quad (V)$$

wherein X is hydrogen or methyl, n is 0, 1, 2 or 3, and m is an integer ranging from 3 to 65, or a unit of formula (VI), (VIII)

wherein z is hydrogen, alkyl, aryl or halogen, r is 4, m is an integer ranging from 3 to 65, w is 0 or 1, and a, b and c

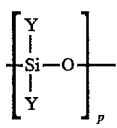 (VI)

wherein Y is alkyl or aryl and p is an integer ranging from 5 to 30.

10. A process for preparing melt-processable block copolyesterimides, characterized by mixing a carboxyl-terminated compound of formula (X)

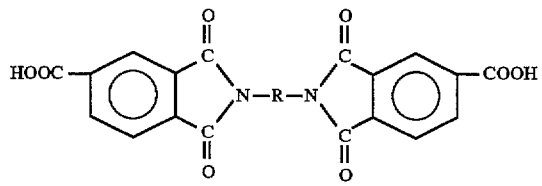 (X)

wherein R comprises repeating units of formula (V),

 (V)

wherein X is hydrogen or methyl, n is 0, 1, 2 or 3, and m is an integer ranging from 3 to 65, or, optionally, repeating units of formula (VI)

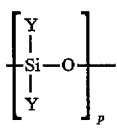 (VI)

wherein Y is alkyl or aryl and p is an integer ranging from 5 to 30, with a para- and/or meta-acetoxycarboxylic acid of formula (XI)

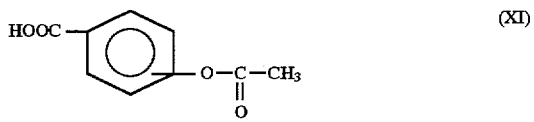 (XI)

and with a diacetoxy compound of formula (XII)

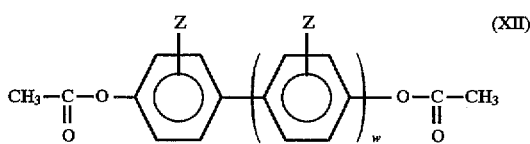 (XII)

wherein w is 0 or 1 and Z represents hydrogen, alkyl, alkoxy, aryl or halogen, and, optionally, with aromatic dicarboxylic acids of formula (XIII)

 (XIII)

wherein Z' represents hydrogen, alkyl, alkoxy, aryl or halogen, then fusing, splitting off the acetic acid formed, and condensing the mixture under reduced pressure at temperatures ranging from 150° C. to 300° C.

11. The process according to claim 10, wherein the carboxyl-terminated compound of formula (X)

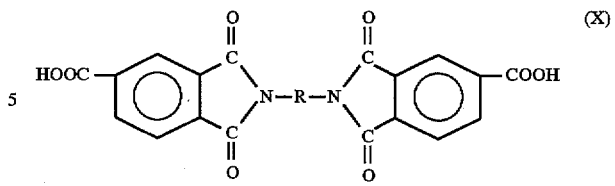 (X)

is prepared by reacting an amino-terminated compound of formula (XV)

wherein R in formulas (X) and (XV) comprises repeating units of formula (V),

 (V)

wherein X is hydrogen or methyl, n is 0, 1, 2 or 3, and m is an integer ranging from 3 to 65, or, optionally, repeating units of formula (VI)

 (VI)

wherein Y is aryl or alkyl and p is an integer ranging from 5 to 30, with a trimellitic anhydride in dioxane followed by removal of dioxane under pressure vacuum and thermal treatment.

12. The process according to claim 10, wherein the polymerizing monomer is obtained by condensing two moles of a para- or meta-hydroxycarboxylic acid of formula (XVI)

 (XVI)

with one mole of an acetoxy compound of formula (XII)

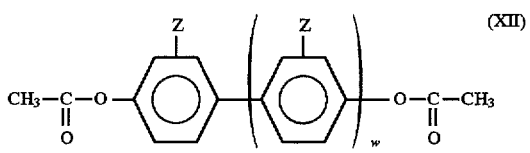 (XII)

followed by acylation of hydroxy groups, or by condensing in pyridine two moles of an acetoxy carboxylic acid chloride derived from a compound of formula (XI)

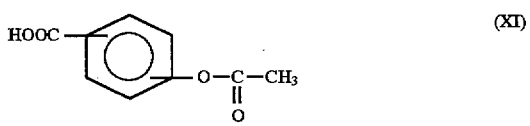 (XI)

with one mole of a dihydroxy compound of formula (XVII)

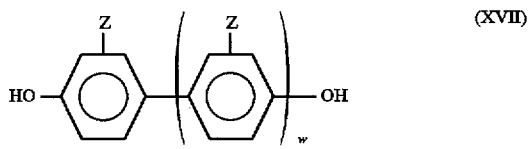 (XVII)

wherein z is hydrogen, alkyl, alkoxy, aryl or halogen, and w is zero or one, followed by precipitation and extraction in methanol and drying.

13. A compound which comprises a polymer matrix consisting of a thermoplastic polymer and a liquid crystalline polymer blended with the matrix, characterized in that the liquid crystalline polymer comprises a block copolyesterimide according to claim 1.

14. A compound according to claim 13, wherein the polymer matrix consists of a polyolefin or a polyolefinic copolymer, of a polyester, a polyamide or a polyether.

* * * * *